UNITED STATES PATENT OFFICE.

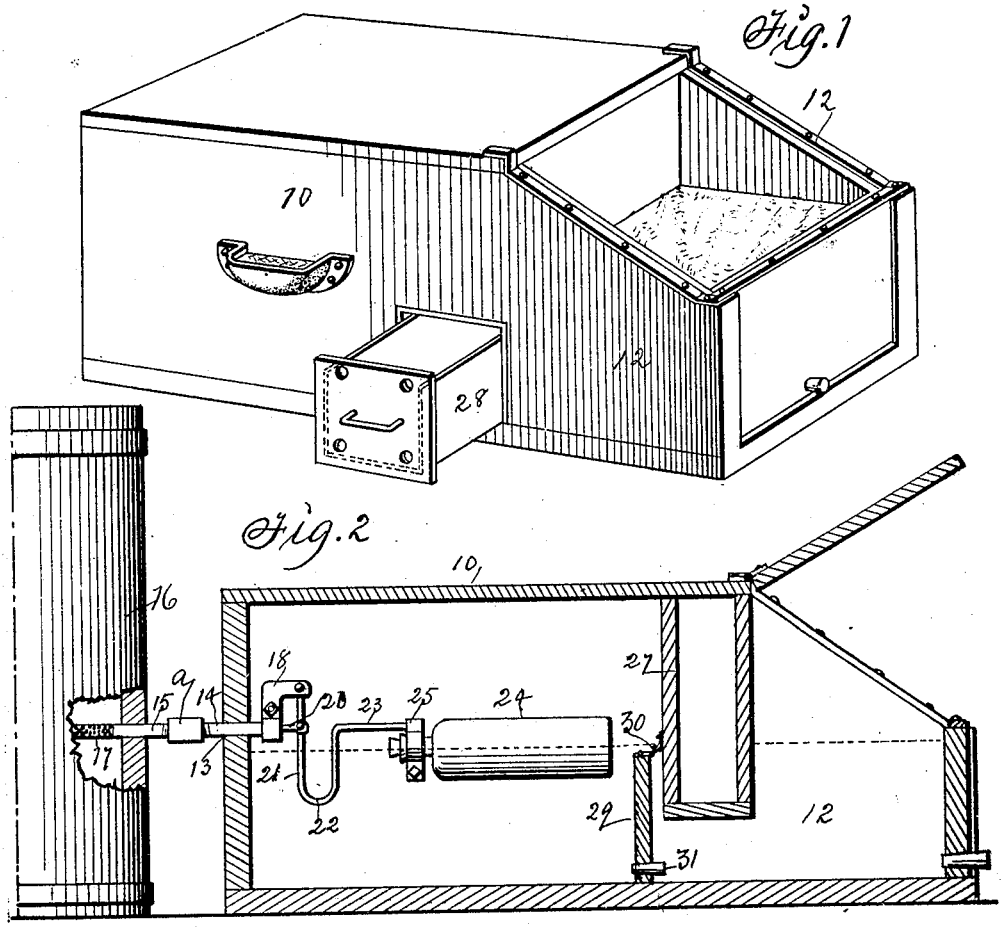

CHARLES PELMULDER, OF GRANT CITY, IOWA.

AUTOMATIC HOG-WATERER.

No. 913,158.  Specification of Letters Patent.  Patented Feb. 23, 1909.

Application filed January 10, 1908. Serial No. 410,697.

*To all whom it may concern:*

Be it known that I, CHARLES PELMULDER, a citizen of the United States, residing at Grant City, in the county of Sac and State of Iowa, have invented a new and useful Improvement in Automatic Hog-Waterers, of which the following is a specification.

My invention relates to the automatic hog waterer for which United States Letters-Patent No. 846,424 were granted to me March 5, 1907, and consists in the construction, arrangement and combination of parts as hereinafter set forth, pointed out in my claims and illustrated in the accompanying drawings, in which:

Figure 1 is a perspective view that shows a drawer adapted to inclose a lamp or other heating device for preventing water freezing in the trough in extremely cold weather. Fig. 2 is a sectional view of the trough and shows my new way of constructing and operating a valve for filtering water and regulating its flow from a tank into the trough and other improvements. Fig. 3 is an enlarged detail view of the valve and valve operating mechanism.

The numeral 10 designates a trough that may vary in dimensions as desired. It has an extension 12, at one end that is adapted to admit the noses of animals as required to drink water therefrom. One end of the covered trough has an aperture 13 that allows water to flow into it through a supply pipe composed of two parts 14 and 15. The part 14 is fixed in the aperture in the trough and the part 15 is connected with the other part 14 by a coupling *a* and extended into a tank 16, or source of water supply and terminating in a filter 17.

An elbow-shaped valve support, 18, is connected with the inner end of the pipe 14, as required for pivotally connecting a tapering valve 19, on the stem 20, and a float therewith as shown in Figs. 2 and 3. A float-support 21 is made of a single piece of wire by bending one end portion into an arch 22 that will project downwards while the other straight end portion 23 extends horizontally and is connected with a float, 24, preferably a bottle, by means of a collar 25, fixed to the wire and clamped fast to the float by means of a screw bolt and nut, as shown in Fig. 2, or in any other suitable way that will allow the rise and descent of the float to actuate the valve 19 fixed to the arched part 22, to open and close the outer end of the part 14 of the supply pipe. The valve is preferably made of rubber and fixed to the stem 20. The valve support 18 must necessarily project above the pipe 14 and the float carrier 21 curve downward in order to produce an operative device within the trough.

It is obvious when a sufficient quantity of water has entered the trough to elevate the float 24 into position, as shown in Fig. 2 and to allow the extension 12 to be filled, as required to allow animals to drink therefrom, the valve 19 will engage the pipe 14 and close it.

A dead air chamber 27 is provided contiguous to the top of the extension 12, as shown in Fig. 2, or in any suitable way, to prevent water from freezing. A drawer 28 is fitted in the side and lower part of the trough 10, as shown in Fig. 1, for placing a lamp, or other suitable heating device therein, when it is extremely cold, to prevent water from freezing. It is also obvious a tank heater may be placed in the extension 12 of the trough for the same purpose. A partition 29 is fixed in the lower part of the trough in rear of the dead air chamber 27. Connected with the dead air chamber, the side walls of the trough and the partition is a perforated metal strip 30, as shown in Fig. 2, or in any suitable way, in such a manner that water must flow through the perforated metal strip and is strained to enter the part 12 so that the water that enters the part 12 will be purified by means of the strainer. A plug 31 fitted in an aperture in the lower portion of the partition can be withdrawn for allowing water to flow through the partition and carrying off sediment and stale water from the trough.

In the practical use of my invention during cold weather I place manure, ground or other suitable material around and over all of the trough excepting the extension 12 from which animals will drink. The dead air chamber 27 contiguous to said extension and in front of the partition 29 over which water flows from the trough into the extension, will materially aid in preventing water from freezing and closing communication between the trough and the extension.

Having thus set forth the purposes of my invention and described the construction and manner of use, its practical operation and utility will be understood by persons familiar with the art to which it pertains.

What I claim as new and desire to secure by Letters-Patent, is:

1. In a trough for watering hogs, a cover fixed on the main portion of the trough, an extension at one end of the trough accessible to animals for drinking therefrom, a dead air chamber in the upper portion of the trough and extending down into the water, a partition in the lower portion of the trough and back of the dead air chamber having an aperture and plug therein and a strainer between the partition and the lower end of the dead air chamber, arranged and combined to operate as set forth.

2. An automatic hog waterer comprising a covered trough, an extension at one end of the trough to allow an animal access to water therein, a dead air chamber, a partition at the lower end of the dead air chamber provided with an aperture and plug at its lower end and filter at its top, a supply pipe extended into the trough, a valve and stem in the pipe, a bearer projecting up from the inner end of the pipe, a float carrier curved downward and pivotally connected with the top of the bearer, a collar on the end of the carrier and a float fixed to the collar, arranged and combined to operate as set forth.

CHARLES PELMULDER.

Witnesses:
 WM. HOOK,
 G. F. BARTO.